United States Patent [19]

Mau

[11] Patent Number: 4,721,040
[45] Date of Patent: Jan. 26, 1988

[54] SEAMLESS PRESSURE RESPONSIVE DIAPHRAGM INSTALLATION

[75] Inventor: Robert Mau, Howell, Mich.

[73] Assignee: Filtra-Systems Company, Farmington, Mich.

[21] Appl. No.: 895,233

[22] Filed: Aug. 11, 1986

[51] Int. Cl.⁴ .................. B30B 5/02; B30B 15/06; B31B 1/26; B31B 3/90
[52] U.S. Cl. .................. 100/211; 100/194; 100/295; 49/493; 220/62; 220/73; 229/169; 229/186; 493/84; 493/162; 493/243; 493/902
[58] Field of Search .................. 220/62, 73, 240, 350, 220/357, DIG. 22; 229/43; 493/84, 114, 162, 167, 174, 175, 176, 243, 397, 456, 457, 902; 49/493; 100/194, 211, 295

[56] References Cited

U.S. PATENT DOCUMENTS

| | | | |
|---|---|---|---|
| 3,098,429 | 7/1963 | Hagglund | 100/211 |
| 3,550,835 | 12/1970 | Persson | 229/43 |
| 3,968,282 | 7/1976 | Engel | 100/211 |
| 4,430,231 | 2/1984 | Bratten | 210/783 |

Primary Examiner—Robert P. Olszewski
Assistant Examiner—William E. Terrell
Attorney, Agent, or Firm—John R. Benefiel

[57] ABSTRACT

A flanged, dish shaped rectangular pressure responsive diaphragm is made from non-stretchable flat sheet stock in which the corners are formed with a tapering loop of excess material, and pleat folds take up the excess flange material to allow a tab portion to lie flat across the corner. Spacer strips and pieces are added to provide a uniform flange thickness.

2 Claims, 5 Drawing Figures

U.S. Patent Jan. 26, 1988 4,721,040
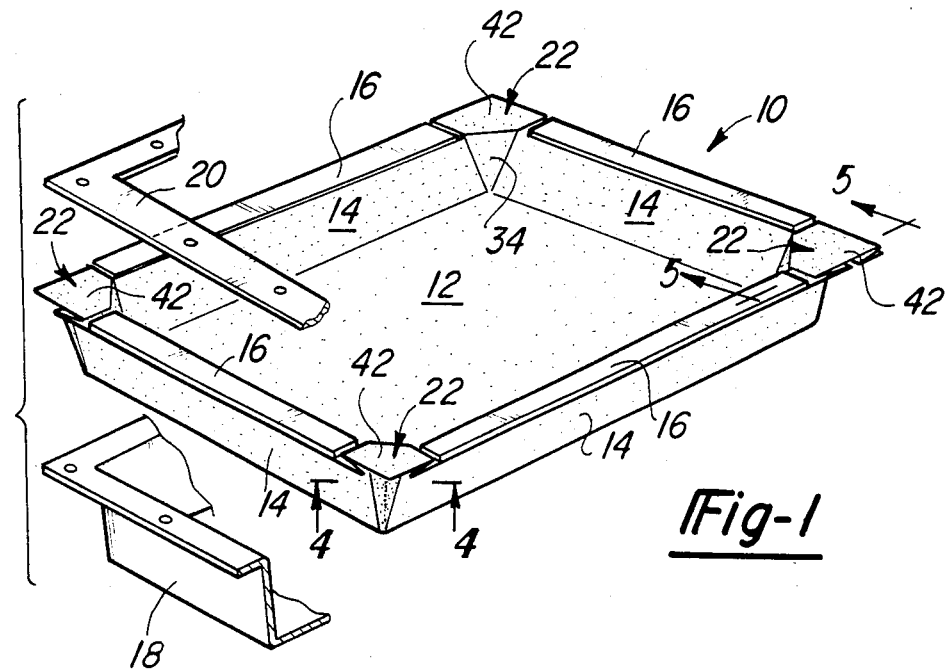
*Fig-1*
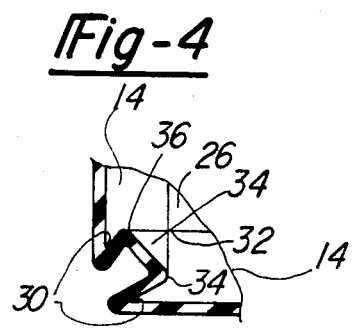
*Fig-4*
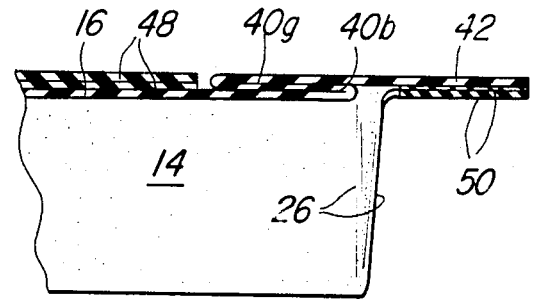
*Fig-5*
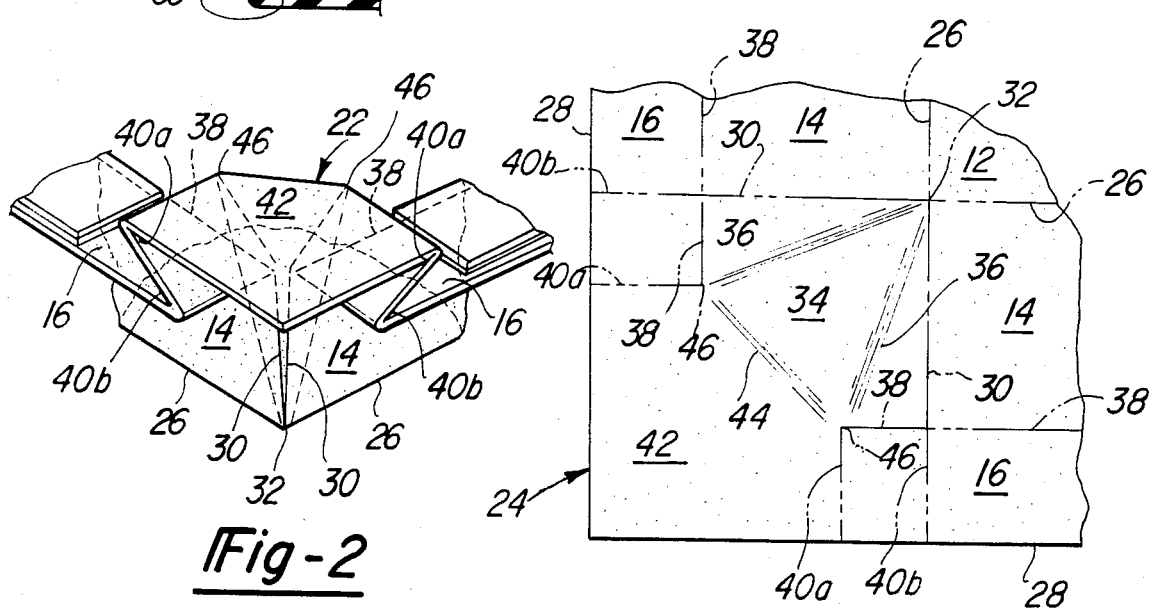
*Fig-2*
*Fig-3*

4,721,040

SEAMLESS PRESSURE RESPONSIVE DIAPHRAGM INSTALLATION

BACKGROUND OF THE INVENTION

This invention concerns pressure responsive diaphragms and methods of manufacture thereof, and more particularly such diaphragms which are dish shaped to be able to be forced into a housing cavity during use without substantial stretching of the diaphragm material.

Pressure responsive diaphragms are utilized in a great number of applications for accomplishing various purposes.

In U.S. Pat. No. 4,430,231 there is disclosed a high pressure industrial filtering apparatus which includes a generally rectangular housing defining a rectangular filtering cavity. A dewatering diaphragm is mounted above the cavity and pressurized at moderately high pressure to force water out of accumulated filter "cake" prior to a cleaning cycle of a filter belt in the filtering cavity.

The diaphragm for such application must be relatively rugged since repeated contact under heavy pressure with filtered solids is entailed, and the diaphragm must be able to be tightly sealed against the filtering and diaphragm operating pressure.

The use of stretchable material to enable movement into the cavity is not practical for such application due to the rugged construction required.

A molded construction is costly, particularly for the relatively great size of such industrial filters.

Fabrication from flat sheet stock has heretofore required seams to be formed at the corners, which seams are subject to failure under these moderately high pressures.

Accordingly, it is an object of the present invention to provide a method of constructing a flanged dish shaped diaphragm from flat sheet material which accommodates movement upon being pressurized and forced into a cavity without significant stretching, but which does not involve corner seams.

SUMMARY OF THE INVENTION

This and other objects are accomplished by shaping a rectangular piece of sheet material into a dish shape, with a unique seamless construction of each corner.

The sheet is folded up along bottom folds on each side located a distance inward from the periphery equal to the depth of the cavity plus the width of a sealing flange.

At each corner, the material is folded along corner folds extending from the intersection of the bottom folds, with a loop of excess material gathered inwardly as the corner folds are brought towards each other as the sides are raised.

A peripheral flange is formed by folding the material outwardly along flange folds, and pleat folds are formed at each corner in the excess flange material to take up the excess flange material, which also forms a tab lying flat across each corner.

Filler strips of the sheet material are added atop the flange in the regions on either side of the cam pleated corner portions, and filler pieces beneath the tab, to produce a triple thick sealing flange of uniform thickness extending about the periphery, so as to be able to be clamped and sealed between housing members at the installation of the finished diaphragm.

DESCRIPTION OF THE DRAWINGS

FIG. 1 is a perspective view of a dish shaped diaphragm according to the present invention, with a perspective view of a portion of a housing component for mounting thereof.

FIG. 2 is a fragmentary enlarged view of one corner of the diaphragm shown in FIG. 1.

FIG. 3 is a fragmentary plan view of a corner of the sheet material used to form the diaphragm according to the present invention, with the various folds indicated thereon.

FIG. 4 is a view of the section 4—4 taken through the corner of the diaphragm in FIG. 1.

FIG. 5 is a view of the section 5—5 taken in FIG. 1.

DETAILED DESCRIPTION

In the following detailed description, certain specific terminology will be employed for the sake of clarity and a particular embodiment described in accordance with 35 USC 112, but it should be understood that the same is not intended to be limiting and should not be so construed inasmuch as the invention is capable of taking many forms and variations within the scope of the appended claims.

Referring to FIG. 1, a dish-shaped diaphragm 10 according to the present invention is depicted having a central bottom portion 12 surrounded by sides 14 extending about the periphery thereof of a predetermined depth.

A horizontally extending flange portion 16 also extends outwardly from the upper border of the sides 14, enabling a clamping sealing arrangement between a housing member 18 and clamping member 20, to allow a fluid pressure to be exerted across the diaphragm 10 without leakage of fluid.

Seamless corner folds 22 comprise each corner of the rectangular diaphragm. According to the concept of the present invention, the corner folds 22 are all formed together with the bottom 12, sides 14, and flange 16 being formed from a single sheet of flat sheet stock made of a suitable flexible, but not significantly stretchable, material, but without requiring any seams.

One eighth inch thick nylon reinforced neoprene rubber has been determined to be a suitable material for the particular industrial filtration application referred to above.

FIGS. 2–4 show the details of the corner folds 22 and the method of constructing the same.

The sides 14 are each established by folding a rectangular sheet 24 of flat stock material along bottom folds 26 extending about the perimeter of the sheet 24 spaced inwardly from the outer edge 28 the combined distance of the depth of the sides 14 and the width of the flange portion 16.

As the sides 14 are raised, folds are also made along a pair of corner folds 30 at each corner, the corner folds 30 each aligned with bottom folds 26 and extending from the intersection 32 of the bottom folds 26.

The sides 14 are moved towards each other to approximately the vertical position with folding up of the edges of the sheet member 24 along bottom folds in creating the corners 22.

The folding along corner folds 30 creates a tapering loop of excess material 34 lying between the corner folds 30 as these are moved towards each other. The loop of excess material is gathered inwardly to extend towards the interior of the dished diaphragm 10, curving back approximately along curved regions 36 as shown in FIG. 4.

The flanges 16 are formed by folding the edges outward along flange folds 38 spaced inwardly from the edges 28 a distance equal to the width of the flanges 16.

The excess material in the region of the flange 16 is gathered by the presence of a pair of pleats at each corner formed by pleating of folds 40a and 40b, each lying transversely to the flanges 16 and shortening the flanges 16 a distance extending upward allowing the corner folds 16 to be moved to their final position.

The foregoing procedure allows the remaining excess material to be laid flat atop each corner in the form of a tab 42 curved along region 44, extending from the inside corners 46 at the end of upper pleat fold 40a.

The presence of the pleat folds 40a and 40b creates a triple thickness of material in the region of the flanges 16, and it is desirable to have uniform thickness of the flanges 16 to aid in clamp sealing of the diaphragm.

Therefore, as shown in FIG. 5, spacers are provided, including a pair of side strips 48 glued atop each flange 16, and a pair of corner pieces 50 glued beneath each tab 42, so that a single thickness through the flange 16 is established around the entire periphery.

Accordingly, it can be appreciated that a seamless corner construction has been provided while utilizing sheet stock material to create a dish shaped diaphragm. This allows a rugged non-stretching member to be employed without entailing the cost of specially molding the diaphragm member to such shape. At the same time, the steps of fabrication are simple and need no elaborate equipment to execute.

I claim:

1. A pressure responsive diaphragm installation comprising:
    a rigid housing member forming a generally rectangular cavity having a bottom, upright sides, and corners at the intersections thereof together defining a pressure chamber,
    said housing member further having a flange portion extending about the periphery of said cavity;
    a diaphragm of a flexible material, said diaphragm constructed by:
    folding the peripheral edge region of a flat rectangular sheet of said material upward from a center region along bottom folds spaced from the peripheral edge thereof a distance equal to the depth of the sides of said housing member cavity combined with the width of the flange portion thereof;
    forming upright corners at each corner of said flat rectangular sheet to be interfit with said housing member cavity, by folding said material along a pair of corner folds at each corner extending from the intersection of each bottom fold and each aligned with a respective one of the bottom folds;
    gathering a tapered loop of excess material inwardly at each corner as said sides are raised up by folding along said bottom folds;
    folding a top section of each of the sides outwardly along respective flange folds to form a flange portion along each side configured to overlie said housing member flange portion; and
    forming a pleat on either side of each corner in said flange portion by folding along a pair of transverse flange folds to allow the top of the gathered loop of material at each corner to lie flat across said corner in the form of a tab curving from the loop of excess material, whereby seamless diaphragm corners are provided; and
    a rigid clamping member shaped to overlie said housing member and diaphragm flange portions, whereby enabling sealing of said diaphragm flange portion against said housing flange portion.

2. The installation according to claim 1 further including spacer pieces of flat stock disposed along each flange portion to equal the thickness of the corner pleats, and beneath said gathered material intermediate the pleats, whereby a uniform thickness of said diaphragm is provided completely about the upper periphery of said diaphragm.

* * * * *